United States Patent Office 2,992,687
Patented July 18, 1961

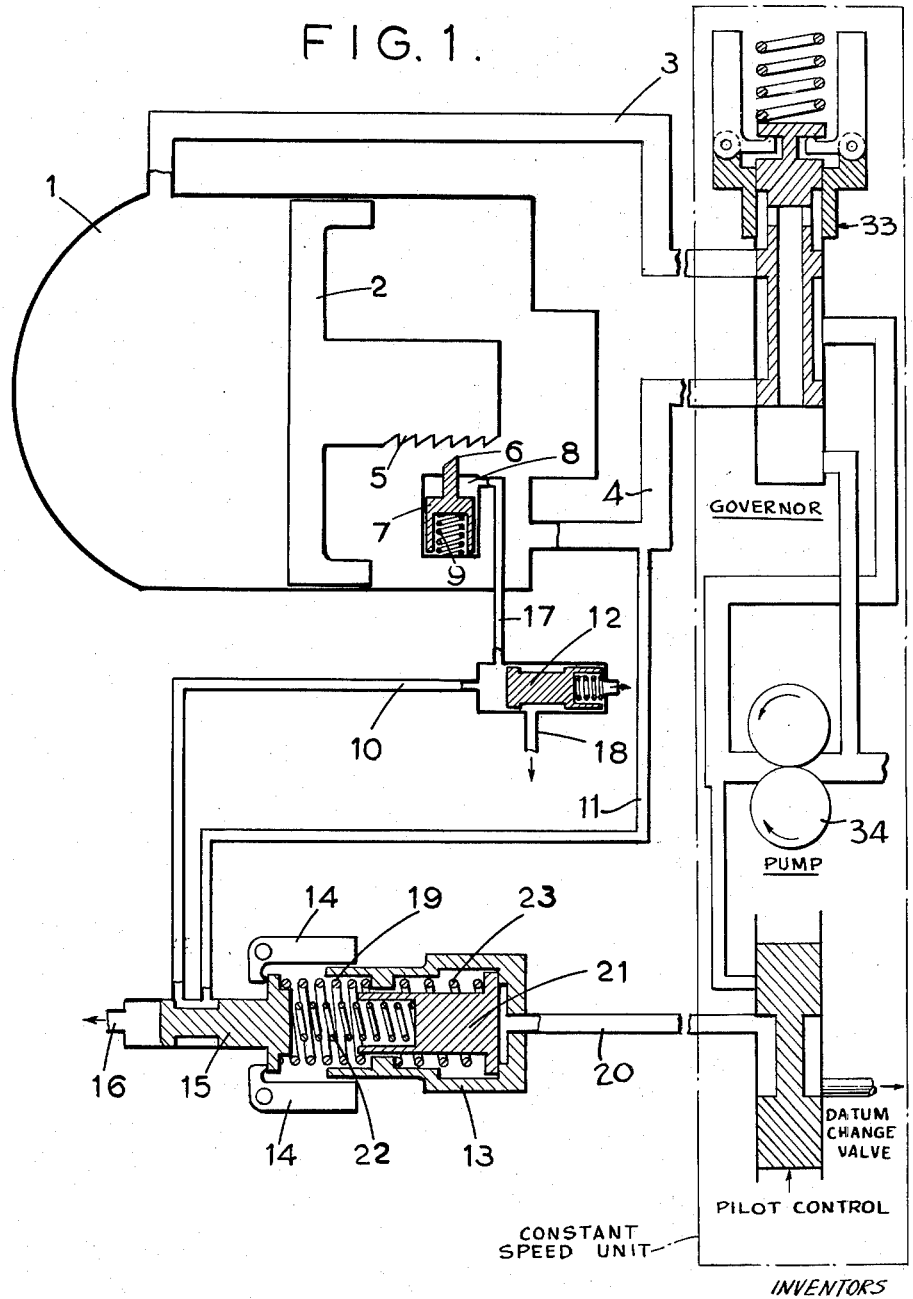

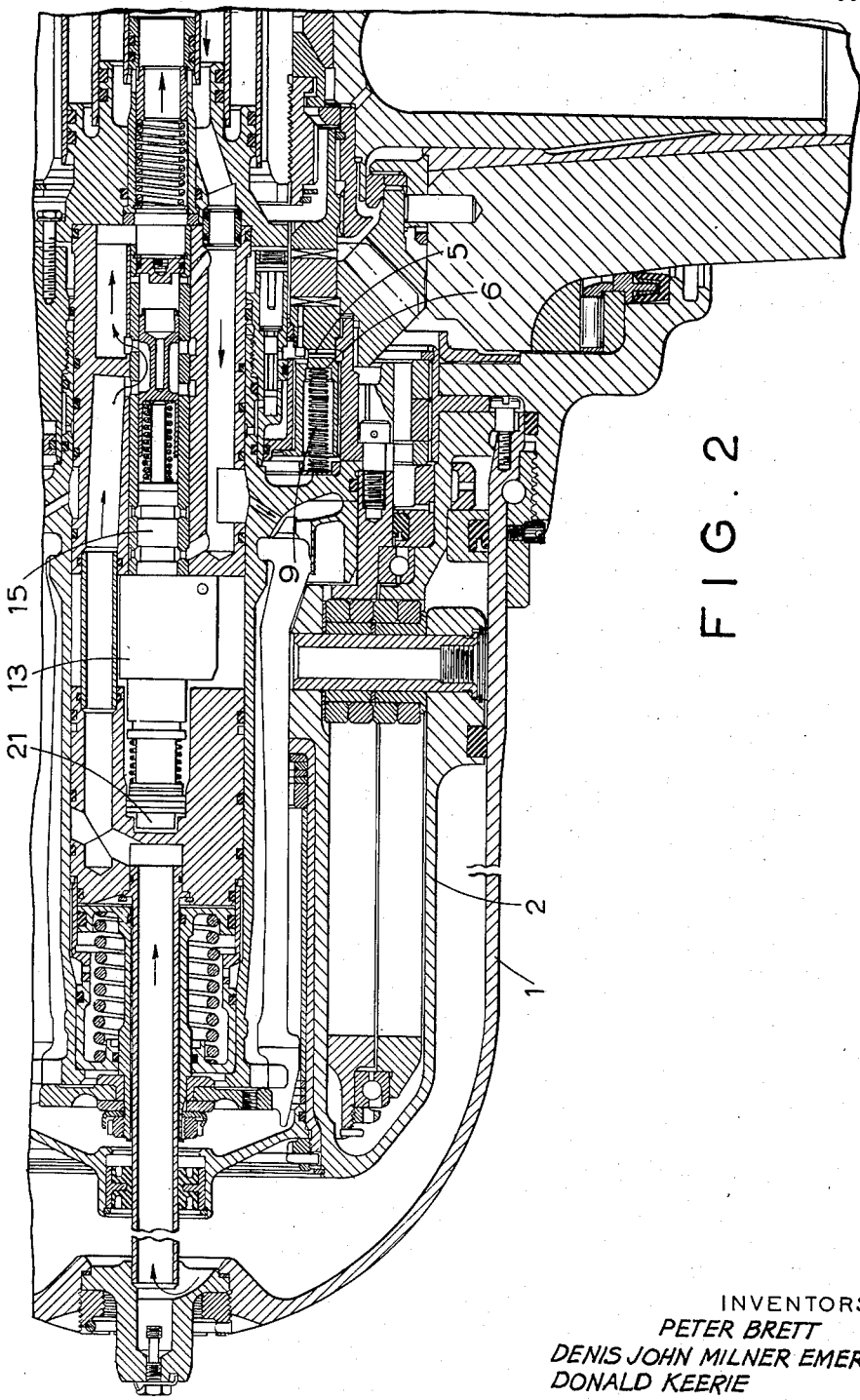

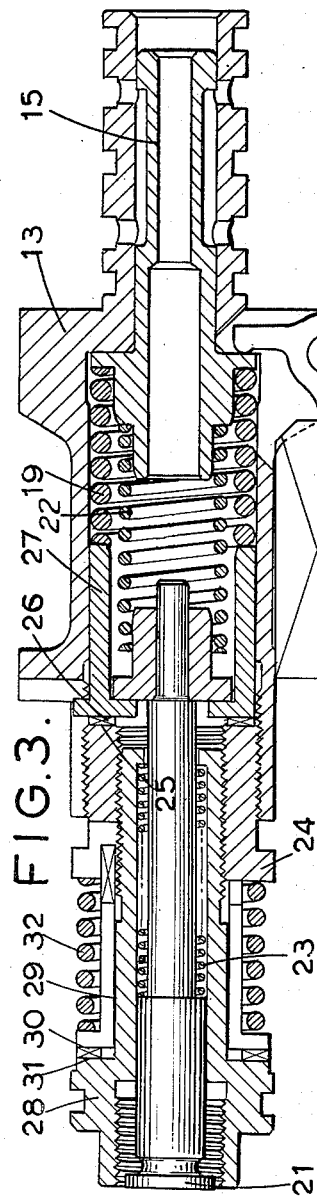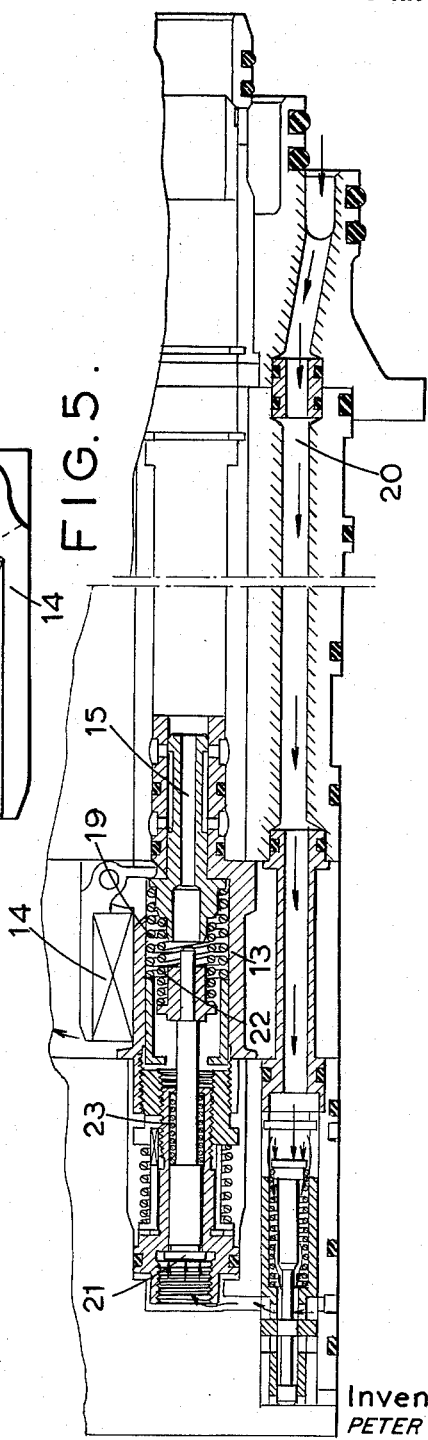

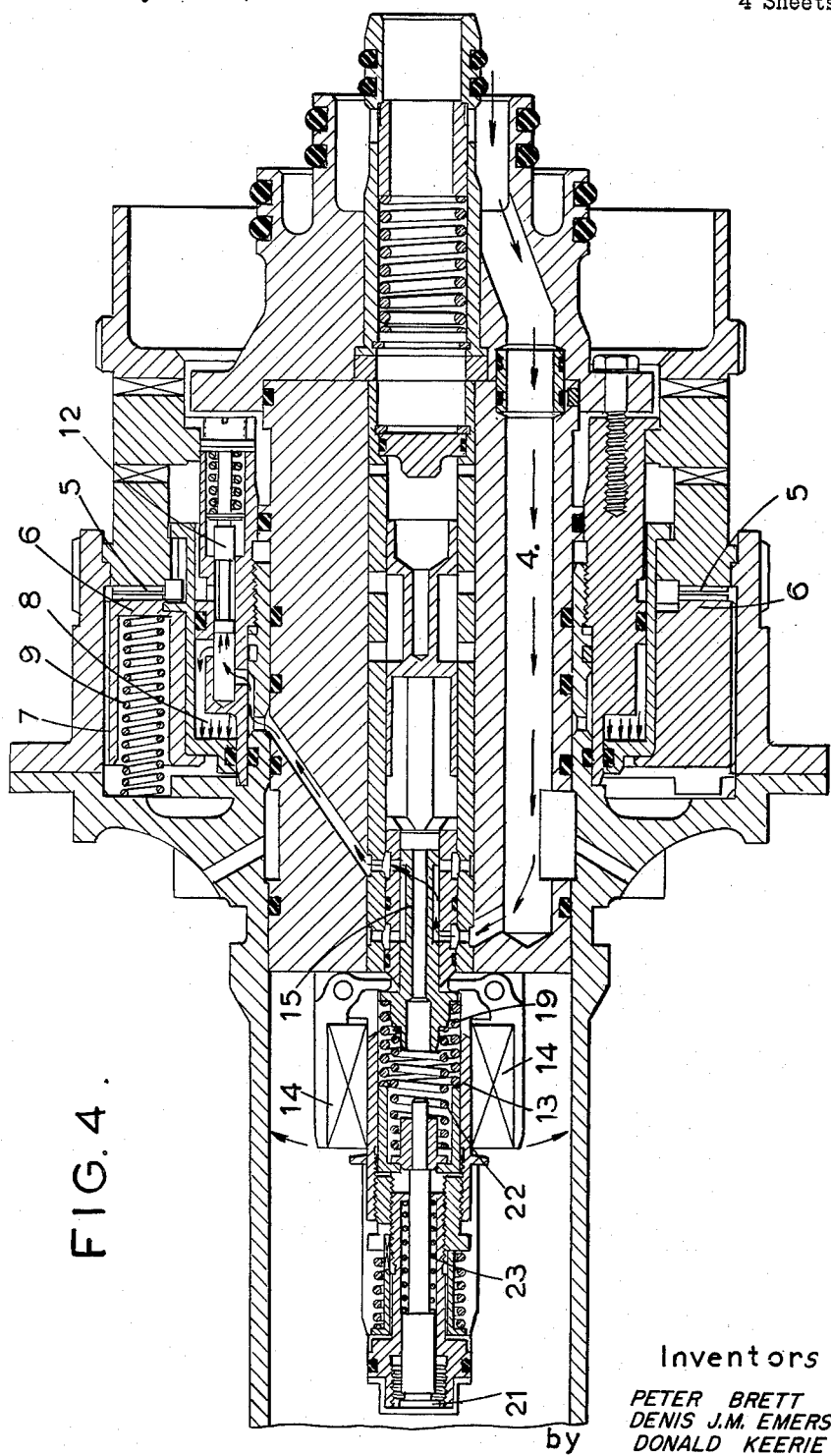

2,992,687
VARIABLE PITCH PROPELLER CONTROL SYSTEM
Peter Brett and Denis John Milner Emerson, London, and Donald Keerie, London Colney, England, assignors, by mesne assignments, to The De Havilland Aircraft Company Limited, Hatfield, England, a company of Great Britain
Filed July 5, 1957, Ser. No. 670,197
Claims priority, application Great Britain July 6, 1956
9 Claims. (Cl. 170—160.21)

This invention relates to variable pitch propeller control systems, the chief object being to effect certain improvements in the safety of such systems as applied to modern high speed aircraft.

The natural tendency of a variable pitch propeller in the absence of any controlling force is to decrease its pitch angle. A failure of the controlling force is therefore dangerous because it allows the engine to overspeed and also because it may produce sufficient drag to cause loss of control of the aircraft. A stop known as the flight fine pitch stop, is normally provided to limit the range of pitch angle in flight.

In a modern propeller installation, due partly to the characteristics of turbine engines and partly to the high speeds and altitudes at which the aircraft fly, the flight fine pitch stop cannot be set at a sufficiently high angle to preclude the possibility of excessive overspeed and drag in the event of failure of the control system.

The problem could be met by providing several stops at intervals in the governing range of the propeller but the pilot would have to be able to withdraw these at will and this would considerably increase the complication of the propeller control mechanism.

Alternatively, an overspeed pitch lock device could be provided centrifugally or electrically operated to lock the pitch of the propeller when a given overspeed occurred, but since such a device would have to be set to trip at a speed above maximum take-off speed, if the propeller should go out of control, a dangerously fine pitch angle could still be achieved under certain flight conditions before the tripping speed was reached.

The present invention relates to control systems for variable pitch propellers of the kind which include a constant speed unit, including a pitch change governor to maintain a substantially constant propeller speed, and an overspeed pitch lock, the latter being usually also operated by a separate centrifugal device distinct from the constant speed unit.

It is the practice to provide pilot operable control means for setting the constant speed unit to select an engine/propeller speed to suit particular operating conditions, for example, maximum rotational speed for take-off, but hitherto no such means was provided whereby the pilot of the aircraft could set the overspeed device to engage the pitch lock at other than one predetermined speed.

According to the present invention, a control system for a variable pitch propeller having a pitch lock operable to prevent pitch change in a fine pitch direction, and a constant speed unit including a pitch change governor to maintain a substantially constant propeller speed, includes an overspeed pitch lock device sensitive to propeller speed, independent of such pitch change governor and connected to the pitch lock for operating the pitch lock at a particular predetermined speed and pilot-controlled means operatively connected to the pitch lock device for setting the device to operate at a propeller speed higher than the aforementioned predetermined speed.

It will be understood that the predetermined speed and the higher speed are normally chosen to be slightly higher than maximum continuous cruising rotational speed and maximum take-off rotational speed, respectively. The relationship between the selected speed and the speed at which the pitch lock functions is determined by the propeller designer such that under the most adverse combinations of failures in the propeller control system, the propeller cannot achieve a dangerously fine pitch angle.

The method of interconnection between the overspeed pitch lock device and the pitch lock mechanism, and between the overspeed pitch lock device and the constant speed unit may take any desired form to suit the particular type of propeller control system. For example, the units may be connected together mechanically, hydraulically or electrically. The method employed will, to a certain extent, be determined by the positioning of the overspeed pitch lock device and the pitch lock mechanism and the distance separating these from the constant speed unit.

In some propellers, a centrifugally operated overspeed pitch lock device is situated in the extreme nose of the propeller hub so that it can be set by hand easily when on the ground by varying the tension of a restraining spring associated with centrifugal weights. In such a case, the connection between the overspeed pitch lock device and constant speed unit will have to pass through or around the propeller hub.

It is, however, within the scope of the invention to position the overspeed pitch lock device in the constant speed control, both the pitch change governor and the pitch lock device being similarly but individually controlled by their own counter weights.

The pitch lock mechanism proper may take any suitable form but preferably takes the form of a tooth and ratchet mechanism which can be brought into engagement at a particular setting of the control lock, to lock the pitch change unit against movement towards fine pitch.

The pitch lock proper may also alternatively be hydraulic, or both mechanical and hydraulic mechanisms may be used, both tripped by the same overspeed pitch lock device so that the hydraulic mechanism would protect the ratchet teeth of the mechanical pitch lock from shock loads.

Referring to the drawings:
FIGURE 1 illustrates diagrammatically the main component parts of the variable pitch propeller control mechanism in accordance with the invention;
FIGURE 2 is a longitudinal section through the propeller hub;
FIGURE 3 is a longitudinal section of the centrifugally operated control valve for the hydraulic fluid; and
FIGURES 4 and 5 are longitudinal sections through the main components in the propeller hub, the two sections being taken through the fine pitch oil line and third oil line respectively.

The drawings illustrate a preferred embodiment of the invention wherein the centrifugal pitch lock device controlling the operation of the pitch lock is situated in the propeller hub.

Referring in the first case to the diagrammatic drawing shown in FIGURE 1, reference numeral 1 indicates the dome or cylinder of the propeller in which the piston 2 is slidable axially to vary the pitch of the propeller blades in known manner under the control of a control unit, including a centrifugal pitch change governor 33 generally referred to as the constant speed unit. The two fluid passageways leading to opposite sides of the piston and generally referred to as the coarse and fine pitch lines are indicated by reference numerals 3 and 4 respectively. Supply of fluid under pressure from a pump 34 of the constant speed unit to one or other of these lines in under the control of a valve of the governor 33 in conventional manner.

The pitch lock is indicated by teeth 5 on the piston which are engageable by a tooth 6 on a poston 7 slidable within a cylinder 8, the tooth 6 being urged into engagement with teeth 5 by a coil spring 9. The tooth 6 is held normally out of engagement with teeth 5 by pressure in hydraulic fluid lines 10 and 11, line 11 being connected directly with fine pitch line 4.

The pressure in line 10 maintains spring urged relief valve 12 in the position shown.

The centrifugal pitch lock device is indicated generally by reference numeral 13 and includes centrifugal weights 14 which when flung outwardly under centrifugal force move their associated control valve 15 to the right to blank off line 11 and connect line 10 to drain by way of line 16, thus releasing the pressure in line 10 and allowing spring 9 to move tooth 6 into interlocking engagement with teeth 5. At the same time, release of pressure in line 10 will allow relief valve 12 to move to the left under the action of its associated spring and connect cylinder 8 to drain by way of lines 17 and 18.

The first control spring of the centrifugal device 13 is indicated by reference numeral 19 and this spring is so designed that the centrifugal device 13 will operate at 5% above maximum continuous cruising rotational speed to bring the pitch lock into operation.

As the speed drops, the spring 19 overcomes the centrifugal force and returns the valve 15 to the position shown in which the resumption of hydraulic pressure in lines 10 and 11 will bring about release of the pitch lock and return relief valve 12 to the position shown.

When it is required to set the centrifugal device 13 to operate at 5% above maximum take-off rotational speed, the propeller control or constant speed unit is operated to transmit hydraulic pressure via the third oil line 20 to the head of plunger 21 forcing it to move to the left until further movement is prevented by a shoulder in the plunger housing.

The second control spring of the device 13 is indicated by reference numeral 22 and as this spring will be compressed by movement of plunger 21, the weights 14 will now have to overcome the loads exerted by both control springs 19 and 22 and the effective rate of the two springs is the sum of their individual rates.

The springs must be carefully designed so that the rate of the first control spring 19 matches the characteristic of the weights 14 at the lower datum, while the combined rate of the two springs matches the characteristic of the weights at the higher datum.

When returning to the lower datum, the propeller control or constant speed unit is operated to release the pressure on the plunger head and the plunger is returned by return spring 23 so that the second control spring 22 no longer exerts any load on the valve 15.

FIGURE 2 illustrates how the pitch lock centrifugal device 13 and its associated valve are mounted axially within a propeller hub together with the pitch lock mechanism including toothed components 5 and 6, the latter being urged into engagement with teeth 5 by coil springs 9.

As the bulk of the mechanism shown in FIGURE 2 forms no part of the present invention, reference will now be made to FIGURES 3, 4 and 5, which illustrate the main components of the pitch lock and overspeed device on an enlarged scale.

In FIGURE 4, oil pressure in the fine pitch oil line 4 is transferred via valve 15 to the interior of cylinder 8 and acts in the direction of the arrows on the piston 7 to maintain teeth 5 and 6 out of engagement.

The weights 14 can then operate to actuate the pitch lock at 5% above the lower datum speed, i.e. to move the valve 15 axially to shut off the supply of pressure oil from the fine pitch line and connect cylinder 8 to drain, thus allowing springs 9 to take charge and move teeth 5 and 6 into interlocking engagement.

In FIGURE 5 the constant speed unit has been set to apply oil pressure to plunger 21 through the third oil line 20, which is connected with the constant speed unit. The mechanism is thus set to the second higher datum and consequently although the weights 14 will still be free to move the valve 15 to bring the pitch lock into operation, they will only operate at an increased speed, i.e. 5% above maximum take-off speed as they will have to overcome the resistance of the second spring 22 in addition to spring 19.

When the rotational speed has been reduced, the governor must reset itself and restore hydraulic pressure to re-open the pitch lock.

On consideration it is clear that the governor must be isochronous and that the difference between the tripping speed and re-setting speed must be kept fairly small.

For example, to protect the engine against an excessive overspeed due to a failure in the propeller control system during a take-off, the pitch lock device should be set to trip at say, 5% above the maximum take-off rotational speed. If, however, a temporary overspeed of 5% occurs, caused perhaps by a sudden change in aircraft position or throttle opening and if this overspeed is corrected by the propeller control or constant speed unit, the centrifugal pitch lock device having tripped must re-set itself before the rotational speed drops back to the maximum permissible take-off figure, so that the pitch lock will be released and the propeller will be free to govern at the desired speed.

If the centrifugal pitch lock device does not re-set in time, the propeller constant speed unit will be trying to reduce pitch to govern the propeller before the pitch lock is released, and under these conditions, the ratchet teeth, being slightly under-cut, will remain engaged even after the centrifugal pitch lock device has reset, and the desired speed will never be attained.

For the application at present under consideration, it has been calculated that the desired standard of safety can be achieved if the centrifugal pitch lock device has two settings, namely, 5% above maximum continuous cruising rotational speed and 5% above maximum take-off rotational speed, and if the propeller constant speed unit can change the setting from the first to second figure when a speed greater than the maximum continuous speed is selected.

In order to keep the tripping and re-setting speeds of a speed sensitive device as close as possible, it is necessary to match the rate of the spring with the characteristics of the centrifugal weights at the particular speed in question. To change the speed setting of a device of this nature it is not sufficient to change the loading of the spring; the rate of the spring must also be changed to suit the new speed.

As explained above, the springs must be carefully designed so that the rate of the first control spring 19 matches the characteristic of the centrifugal weights 14 at the lower datum while the combined rate of the two control springs 19 and 22 matches the characteristic of the centrifugal weights at the higher datum.

The compression of the control springs 19 and 22 is adjusted independently. The first control spring is adjusted by the nut 24. Radial splines 25 on the end of the nut 24 mate with corresponding splines 26 on a locking piece 27 and are held in engagement by the first governor spring 19. The locking piece is keyed into slots in the valve housing to prevent rotation and the nut 24 is thus locked.

The extent to which the second governor spring 22 can be compressed is varied by screwing the plunger housing 28 further into or out of the nut 24, thereby moving the plunger 21 and its associated spring 23 axially. The housing 28 is locked against relative rotation with respect to the nut 24 by a locking piece 29 having radial splines 30 which interengage with corresponding splines 31 on the plunger housing 28, interengagement being maintained by means of a locking spring 32. The locking piece 29 has a sliding keyed connection with a slot in the nut 24 whereby it can be moved axially with respect to the nut for adjustment purposes but is prevented from rotation relative to the nut. To adjust the plunger housing 28, the teeth 30 and 31 can be separated by forcing the locking piece axially against the spring 32 by a suitable tool or the teeth may be so shaped that they will override one another under a predetermined turning force.

As the hydraulic pressure holding the pitch lock open originates from the fine pitch control line 4, this device will also lock pitch in the event of a failure of hydraulic pressure.

An arrangement using two springs in parallel as described above, is considered satisfactory particularly where the two speed settings are required to be fairly close together.

We claim:

1. In a control system for a variable pitch propeller having a pitch lock operable to prevent pitch change in a fine pitch direction and a constant speed unit including a pitch change governor to maintain a susbtantially constant propeller speed; an overspeed pitch lock device sensitive to propeller speed, independent of such pitch change governor and connected to the pitch lock for operating the pitch lock at a particular predetermined speed and pilot-controlled means operatively connected to the pitch lock device for setting the device to operate at a propeller speed higher than the aforementioned predetermined speed.

2. In a control system for a variable pitch propeller having a pitch lock operable to prevent pitch change in a fine pitch direction and a constant speed unit including a pitch change governor to maintain a substantially constant propeller speed; a centrifugally operated overspeed pitch lock device sensitive to propeller speed, independent of such pitch change governor and connected to the pitch lock for operating the pitch lock at a particular predetermined speed and pilot-controlled means operatively connected to the pitch lock device for setting the device to operate at a propeller speed higher than the aforementioned predetermined speed.

3. In a control system for a variable pitch propeller as claimed in claim 2, said pitch lock device comprising a first spring, counterweights operating against the force of said first spring, a second spring, and means to add the force of said second spring to the force of said first spring so that said pitch lock governor will operate at a higher speed than that at which it is normally set.

4. In a control system for a variable pitch propeller as claimed in claim 3, said last-mentioned means comprising a hydraulic circuit so that said second spring is brought into operation by fluid pressure.

5. In a control system for a variable pitch propeller, having a constant speed unit to maintain a constant engine speed and a pitch lock for locking the pitch of the propeller, a centrifugally operated pitch lock device driven by the propeller power plant to actuate said pitch lock at a predetermined speed, and means under the control of the pilot for setting the centrifugally operated pitch lock device to permit an increase in speed above that permitted under normal flight conditions, but to operate to bring the pitch lock into operation should the maximum take-off engine or propeller speed be exceeded.

6. In a control system for a variable pitch propeller as claimed in claim 5, said pitch lock being hydraulically operated and comprising two intermeshing sets of teeth which prevent change of the propeller pitch when in mesh, spring means urging said teeth into mesh, a hydraulic circuit for normally retaining said teeth out of meshing engagement, and a valve actuated by said pitch lock device for releasing the pressure in said hydraulic circuit to cause said teeth to mesh under the action of said spring means.

7. In a control system for a variable pitch propeller, the combination of a constant speed unit to maintain a constant engine speed, a hydraulic circuit for actuating the blades of the propeller to vary the pitch thereof, said hydraulic circuit including a fine pitch hydraulic line, a pitch lock for locking the pitch of a propeller, spring means urging said pitch lock into the locking position, a centrifugal pitch lock device driven by the propeller power plant to actuate said pitch lock at a predetermined speed, an axially slidable valve actuated by said centrifugal device, a hydraulic line interconnecting said fine pitch line and said pitch lock through said slidable valve so that the fluid pressure in said fine pitch line will hold said pitch lock inoperative when said slidable valve is in its normal position, said centrifugal device operating said slidable valve to release the fluid pressure acting upon said pitch lock so that said spring means will urge the pitch lock into the locking position, and means controlled by the pilot for setting the pitch lock governor to operate at a propeller speed higher than the aforementioned predetermined speed.

8. In a control system for a variable pitch propeller, the combination of a constant speed unit to maintain a constant engine speed, a hydraulic circuit for actuating the blades of the propeller to vary the pitch thereof, said hydraulic circuit including a fine pitch hydraulic line, a pitch lock for locking the pitch of a propeller, a centrifugal pitch lock device driven by the propeller power plant to actuate said pitch lock at a predetermined speed, said pitch lock device comprising a first spring, counterweights operating against the force of said first spring, a second spring and an axially slidable valve actuated by said counterweights, spring means urging said pitch lock into the locking position, a hydraulic line interconnecting said fine pitch line and said pitch lock through said slidable valve so that the fluid pressure in said fine pitch line will hold said pitch lock inoperative when said slidable valve is in its normal position, a plunger acting against said second spring, and a third hydraulic line to admit fluid pressure against said plunger to add the force of said second spring to said first spring to restrain the movement of said counterweights.

9. In a control system for a variable pitch propeller, a propeller hub, a plurality of propeller blades pivotally mounted on said hub, a piston slidable axially within said hub, means connecting said piston and said propeller blades so that the pitch of said propeller blades is varied by the axial movement of said piston, a constant speed unit, first and second hydraulic lines from said constant speed unit to opposite sides of said piston so that a change in pitch of said propeller blades is brought about by a differential pressure between said first and second hydraulic lines, a pitch lock device mounted axially within said propeller hub, a third hydraulic line connecting said constant speed unit and said pitch lock device so that hydraulic pressure is transmitted from said constant speed unit to said pitch lock device, and means under the control of the pilot to apply and release hydraulic pressure to and from said third line for setting said pitch lock governor to operate at one of two propeller speeds.

References Cited in the file of this patent

UNITED STATES PATENTS

| | | |
|---|---|---|
| 2,703,148 | Pearl | Mar. 1, 1955 |
| 2,748,877 | Miller | June 5, 1956 |
| 2,796,138 | Lambeck | June 18, 1957 |